United States Patent
Watanabe et al.

(10) Patent No.: US 7,925,493 B2
(45) Date of Patent: Apr. 12, 2011

(54) MACHINE TRANSLATION APPARATUS AND MACHINE TRANSLATION COMPUTER PROGRAM

(75) Inventors: Taro Watanabe, Kyoto (JP); Eiichiro Sumita, Kyoto (JP)

(73) Assignee: Advanced Telecommunications Research Institute International, Kyoto (JP)

( * ) Notice: Subject to any disclaimer, the term of this patent is extended or adjusted under 35 U.S.C. 154(b) by 1402 days.

(21) Appl. No.: 10/917,420

(22) Filed: Aug. 13, 2004

(65) Prior Publication Data

US 2005/0049851 A1 Mar. 3, 2005

(30) Foreign Application Priority Data

Sep. 1, 2003 (JP) .................................. 2003-308409
May 21, 2004 (JP) .................................. 2004-151965

(51) Int. Cl.
G06F 17/28 (2006.01)

(52) U.S. Cl. .......................... 704/2; 704/4; 704/5; 704/8

(58) Field of Classification Search .................... 704/2–8
See application file for complete search history.

(56) References Cited

U.S. PATENT DOCUMENTS

| | | | |
|---|---|---|---|
| 5,369,574 A | 11/1994 | Masegi et al. | |
| 5,477,451 A | 12/1995 | Brown et al. | |
| 6,236,958 B1 * | 5/2001 | Lange et al. | 704/8 |
| 7,319,949 B2 * | 1/2008 | Pinkham | 704/3 |
| 7,353,165 B2 * | 4/2008 | Zhou et al. | 704/5 |
| 2002/0040292 A1 | 4/2002 | Marcu | |
| 2002/0188439 A1 * | 12/2002 | Marcu | 704/5 |
| 2003/0009322 A1 * | 1/2003 | Marcu | 704/7 |
| 2003/0110023 A1 | 6/2003 | Bangalore et al. | |
| 2004/0024581 A1 * | 2/2004 | Koehn et al. | 704/2 |
| 2004/0034520 A1 * | 2/2004 | Langkilde-Geary et al. | 704/1 |

(Continued)

FOREIGN PATENT DOCUMENTS

JP 2003-006193 A 1/2003

OTHER PUBLICATIONS

Office Action issued in Japanese Patent Application No. JP 2004-151966, dated Nov. 14, 2006.

(Continued)

*Primary Examiner* — David R Hudspeth
*Assistant Examiner* — Lamont M Spooner
(74) *Attorney, Agent, or Firm* — McDermott Will & Emery LLP

(57) ABSTRACT

A method of machine translation, using a bilingual corpus containing translation pairs each consisting of a sentence of a first language and a sentence of a second language, for translating an input sentence of the first language to the second language, including the steps of: receiving the input sentence of the first language and extracting, from the bilingual corpus, a sentence of the second language forming a pair with a sentence of the first language with highest similarity to the input sentence; applying an arbitrary modification among a plurality of predetermined modifications to the extracted sentence of the second language, and computing likelihood of sentences resulting from the modification; selecting a prescribed number of sentences having high likelihood from among the sentences resulting from the modification; repeating, on each of the sentences selected in the step of selecting, the steps of extracting, computing and selecting, until the likelihood no longer improves; and outputting, as a translation of the input sentence, a sentence having the highest likelihood among the sentences of the second language left at the end of the step of repeating.

10 Claims, 6 Drawing Sheets

U.S. PATENT DOCUMENTS

2004/0044530 A1* 3/2004 Moore .......................... 704/254
2008/0015842 A1* 1/2008 Moore ............................ 704/4

OTHER PUBLICATIONS

"ALTFLASH: A Japanese-English Machine Translation System for Market Flash Reports", NTT Technical Journal, Mar. 3, 2001, p. 81-83, vol. 11, No. 3.
"ALTFLASH: A Japanese-English Machine Translation System for Market Flash Reports", The IEICE Transactions (The Institute of Electronics, Information and Communication Engineers), Jun. 1, 2001, p. 1167-1174, vol. J84-D11, No. 6.
"Selection of the Best Output from Multiple MT Engines by Using SMT Scores", Technical Report of IEICE, Jul. 8, 2002, p. 63-68, vol. 102, No. 199.
U.S. Appl. No. 10/917,506, filed Aug. 13, 2004, Sumita et al.
Brown, P.F., et al. "The mathematics of statistical machine translation: Parameter estimation", *Computational Linguistics*, 19(2): 263-311, 1993.
Germann, U., et al, Fast decoding and optimal decoding for machine translation. *Proc of ACL2001*, Toulouse, France, 2001.
Manning, C., et al, *Foundations of Statistical Natural Language Processing*. The MIT Press, Cambridge, Massachusetts, 1999.
Nagao, M., "A framework of a mechanical translation between Japanese and English by analogy principle". In Elithom and R. Banerji, editors, *Artificial and Human Intelligence*. NATO Publications, 1984.
Och, F.J et al., "Discriminative training and maximum entropy models for statistical machine translation." In *Proc. Of ACL 2002*, pp. 295-302, Philadelphia, PA, 2002.
Papineni, K., et al., "Bleu: a method for automatic evaluation of machine translation." In *Proc. Of ACL 2002*, pp. 311-318, 2002.
Takezawa T. et al., "Toward a broad-coverage bilingual corpus for speech translation of travel conversations in the real world." In *Proc of LREC 2002*, pp. 147-152, Las Palmas, Canary Islands, Spain, May 2002.
Watanabe, T., et al., "Bidirectional decoding for statistical machine translation". In *Proc. Of COLING 2002*, pp. 1079-1085, Taipei, Taiwan, Aug. 2002.
Watanabe, T., el al., "Using language and translation models to select the best among outputs from multiple mt systems". In *Proc. Of COLING 2002*, pp. 8-14, Taipei, Taiwan, Aug. 2002.
Brown, R., et al., "Automated Generalization of Translation Examples". In *Proceedings of the Eighteenth International Conference on Computational Linguistics (COLING-2000)*, pp. 125-131, 2000.
Garcia-Vaera, I., et al., "An interactive, dp-based search algorithm for statistical machine translation". In *Proc. Of ICSLP'98*, v. 4, pp. 1135-1138, Sydney, 1998.
Marcu, D., et al., "A phrase-based, joint probability model for statistical machine translation". In *Proc. Of the Conference on Empirical Methods in Natural Language Processing (EMNLP-2002)*, Philadelphis, PA Jul. 2002.
Marcu, D., "Towards a unified approach to memory- and statistical-based machine translation". In *Proc. of ACL 2001*, Toulouse, France, Jul. 2001.
Och, F., et al., "An efficient a* search algorithm for statistical machine translation." In *Proc. of the ACL-2001 Workshop on Data-Driven Methods in Machine Translation*, pp. 9-16, 2001.
Richardson, S., et al., "Overcoming the customization bottleneck using example-based mt". In *Proceedings of the ACL 2001 Workshop on Data-Driven Methods in Machine Translation*, pp. 9-16, 2001.
Sumita E., "Example-based machine translation using dp-matching between word sequences". In *Proc of the ACL 2001* Workshop on Data-Driben Methods in Machine Translation, pp. 9-16, 2001.
Tillman, C., et al., "Word re-ordering and dp-based search in statistical machine translation". In *Proc. of the COLING 2000*, Jul.-Aug. 2000.
Watanabe H., et al., "A transfer system using example-based approach". *IEICE Translations of Information and Systems*, E77-D(2):247-257, 1994.
Way, A., "Translating with examples". In *Proc. of Workshop of example-based machine translation*, MT-Summit VIII, 1999.
Yamada, K et al., "A syntax-based statistical translation model". In *Proc. of ACL 2001*, Toulouse, France, 2001.
Brown, P., et al, "A Statistical Approach to Machine Translation", Computational Linguistics 16, pp. 79-85, 1990.
Sumita, E. "Corpus-Centered Computation," Proc. of S2S Workshop of 40th ACL, pp. 1-8, 2002.
Watanbe, T., et al, Example-based Decoding for Statistical Machine Translation, MTS, 2003.
Sugaya, Fumiaki, et al., "Proposal of an Evaluation Method for Speech Translation Capability by Comparing a Speech Translation System With Humans and Experiments Using the Method." In IEICE Transactions (Japanese Edition), D-II, vol. J84-D-II, No. 11, pp. 2362-2370, 2001. (In Japanese , with English Abstract).
U.S. Appl. No. 10/917,506: Examiner Interview Summary Record (Apr. 19, 2010).
U.S. Appl. No. 10/917,506: Amendment filed with RCE (Apr. 19, 2010).
U.S. Appl. No. 10/917,506: Final Office Action (Jan. 20, 2010).
U.S. Appl. No. 10/917,506: Amendment (Oct. 26, 2009).
U.S. Appl. No. 10/917,506: Amendment (May 13, 2009).
U.S. Appl. No. 10/917,506: Final Office Action (Feb. 13, 2009).
U.S. Appl. No. 10/917,506: Amendment (Oct. 31, 2008).
U.S. Appl. No. 10/917,506: Amendment (Apr. 8, 2008)).
U.S. Appl. No. 10/917,506: Non-final Office Action (Jan. 9, 2008).
U.S. Office Action issued in U.S. Appl. No. 10/917,506, dated Jul. 31, 2008.
United States Office Action issued in U.S. Appl. No. 10/917,506 dated Jun. 10, 2010.

* cited by examiner

MACHINE TRANSLATION APPARATUS AND MACHINE TRANSLATION COMPUTER PROGRAM

BACKGROUND OF THE INVENTION

1. Field of the Invention

The present invention relates to a machine translation apparatus and, more specifically, to a statistical machine translation apparatus capable of performing highly accurate translation taking advantage of example-based translation.

2. Description of the Background Art

The framework of statistical machine translation formulates the problem of translating a sentence in a language (J) into another language (E) as the maximization problem of the following conditional probability.

$$\hat{E} = \underset{E}{\mathrm{argmax}}\ P(E\mid J)$$

According to the Bayes' Rule, $\hat{E}$ may be written as:

$$\hat{E} = \underset{E}{\mathrm{argmax}}\ P(E)P(J\mid E)/P(J)$$

In this equation, $\hat{E}$ may be computed independent of the term P(J). Therefore, $$\hat{E} = \underset{E}{\mathrm{argmax}}\ P(E)P(J\mid E)$$

The first term P(E) on the right side is called a language model, representing the likelihood of sentence E. The second term P(J|E) is called a translation model, representing the probability of generating sentence J from sentence E.

Under this concept, a translation model has been proposed where a sentence of a first language (referred to as a channel target sentence) is mapped to a sentence of a second language (referred to as a channel source sentence) with the notion of word alignment (finding correspondence between words). This translation model has been successfully applied to similar language pairs, such as French-English and German-English.

The translation model, however, achieved little success when applied to drastically different language pairs, such as Japanese-English. The problem lies in the huge search space caused by the frequent insertions/deletions of words, the larger numbers of fertility for each word and the complicated word alignment, experienced in mapping between languages of different structures. Due to search complexity, a beam search decoding algorithm would result in mere sub-optimal (limited/local) solutions.

Word alignment based statistical translation expresses bilingual correspondence by the notion of word alignment A, allowing one-to-many correspondence of words. Word alignment A is an array describing which word of a channel target sentence corresponds to which word of a channel source sentence, using indexes to the words of the channel source sentence. In this array, correspondence to the words of the channel source sentence is denoted by the indexes added to the words of channel source sentence, and the indexes are arranged in accordance with the order of words of the channel target sentence.

FIG. 7 shows Example A of word alignment of English (E) and Japanese (J). Referring to FIG. 7, words 1 to 7 of a sentence 110 of the second language (in this example, English, E) are aligned with words 1 to 6 of a sentence 114 of the first language (in this example, Japanese, J). The alignment is represented by lines 112 connecting the words of channel source sentence 110 to words of channel target sentence 114. By way of example, the word "$show_1$" of channel source sentence 110 generates two words "$mise_5$" and "$tekudasai_6$" of channel target sentence 114. There are no corresponding words in channel source sentence 110 for two words "$no_2$" and "$o_4$" of channel target sentence 114, and therefore, "$NULL_0$" is placed at the head of channel source sentence 110, and the two words are assumed to be aligned therewith. In this case, alignment A would be "7, 0, 4, 0, 1, 1."

Under this word alignment assumption of such mapping, the translation model P(J|E) can be further decomposed as:

$$P(J\mid E) = \sum_A P(J, A\mid E)$$

The term P(J,A|E) on the right side is further decomposed into four components. These four components constitute the prior art process of transferring a channel source sentence E into channel target sentence J having alignment A. The four components are as follows.

(1) Choose the number of words to generate for each word of the channel source sentence according to the Fertility Model. Two translation words may be generated from one word, or a translation word may not be generated at all.

(2) Insert NULLs at appropriate positions of the channel source sentence by the NULL Generation Model.

(3) Translate word-by-word for each generated word by looking up the Lexicon Model.

(4) Reorder the translated words by referring to the Distortion Model. Positioning is determined by the previous word's alignment to capture phrasal constraints.

In this manner, a translation model based on the idea of word alignment is obtained.

A method has been proposed, in which each word of a channel target sentence is translated to a channel source language, the resulting translated words are positioned in the order of the channel target sentence, and various operators are applied to the resulting sentence to generate a number of sentences. (Ulrich Germann, Michael Jahr, Kevin Knight, Daniel Marcu, and Kenji Yamada, "Fast decoding and optimal decoding for machine translation," (2001) in Proc. of ACL2001, Toulouse, France.) In this proposed method, the sentence having the highest likelihood among the thus generated sentences is selected as the translation.

The word alignment based statistical translation model was originally intended for similar language pairs, such as French and English. When applied to Japanese and English, for instance, which have drastically different structures, this model results in very complicated word alignments, as seen in FIG. 7. The complexity is directly reflected by the structural differences. By way of example, English takes an SVO structure while Japanese usually takes the form of SOV. In addition, as is apparent from the example shown in FIG. 7, insertion and deletion occur very frequently. For instance, there exist no corresponding Japanese morphemes for "$the_3$" and "$the_6$" of FIG. 7. Therefore, they should be inserted when the Japanese sentence is translated into English. Similarly, Japanese morphemes "$no_2$" and "$o_4$" should be deleted.

Both the intricate alignments and the insertion/deletion of words lead to a computationally expensive process when a word-by-word beam search is applied. Some pruning strategies have to be introduced, so that the search system can output results in a reasonable time. However, search errors become inevitable under the restricted search space. Though there exist some correlations between translation quality and the probabilities assigned by the translation model, the beam search was often unable to find good translations.

The method proposed by Germann et al. is problematic as the search often reaches a local optimal solution, and it is not the case that highly accurate solution is stably obtained.

SUMMARY OF THE INVENTION

Therefore, an object of the present invention is to provide method and apparatus of machine translation utilizing statistical machine translation, capable of providing high quality translation regardless of language combinations.

Another object of the present invention is to provide method and apparatus of machine translation utilizing statistical machine translation, capable of providing, in a reasonable time, high quality translation regardless of language combinations.

A still further object of the present invention is to provide method and apparatus of machine translation utilizing statistical machine translation, capable of stably providing high quality translation regardless of language combinations.

According to a first aspect, the present invention provides a method of machine translation, using a bilingual corpus containing a plurality of translation pairs each consisting of a sentence of a first language and a sentence of a second language, for translating an input sentence of the first language to the second language, including the steps of: receiving the input sentence of the first language and extracting, from the bilingual corpus, a sentence of the second language forming a pair with a sentence of the first language satisfying a prescribed relation with the input sentence; applying an arbitrary modification among a plurality of predetermined modifications to the extracted sentence of the second language, and computing likelihood of sentences resulting from the modification; selecting sentences having the likelihood satisfying a prescribed condition from among the sentences resulting from the modification; repeating, on each of the sentences selected in the step of selecting, the steps of extracting, computing and selecting, until a predetermined termination condition is satisfied; and outputting, as a translation of the input sentence, a sentence having the likelihood satisfying a predetermined selection condition among the sentences of the second language left at the end of the step of repeating.

From the bilingual corpus, a sentence of a second language paired with a first language and satisfying a prescribed relation with an input sentence is extracted. The sentence of the second language is modified in various manners, and from the resulting sentences, a sentence having a likelihood satisfying a prescribed condition is selected, and these operations are repeated. The sentence finally found to satisfy the selection condition is output as a translation of the input sentence. As the translation pairs in the bilingual corpus are good translations of the counterpart, and therefore, it is highly likely that the extracted sentence of the second language is similar to an ideal translation of the input sentence. The translation selected based on the likelihood among sentences obtained by repeating various modification of the sentence extracted in such a manner would be, with high probability, an ideal translation of the input sentence. As the sentence extracted at first is already close to the ideal translation, it is not likely that the repetition results in a local optimal solution.

Preferably, the extracting step includes the step of receiving the input sentence of the first language, and reading a sentence of the second language forming a pair with a sentence of the first language having a prescribed score representing similarity to the input sentence satisfying a predetermined condition, from the bilingual corpus.

More preferably, the reading step includes the step of receiving the input sentence of the first language, and computing the score between the input sentence and each sentence of the first language contained in the bilingual corpus, identifying one or a plurality of sentences of the first language having the highest score computed in the step of computing the score, and reading, from the bilingual corpus, one or a plurality of sentences of the second language each forming a pair with each of the one or a plurality of sentences of the first language identified in the step of identifying.

In extracting the sentence of the second language, one or a plurality of sentences in the first language having the highest score representing similarity to the input sentence are specified, and sentence or sentences of the second language forming a pair or pairs therewith are read from the bilingual corpus. Using the read sentences of the second language as seeds, modification and computation of likelihood are repeated, and a sentence satisfying a prescribed condition among the resulting sentences is taken as a translation of the input sentence. It is highly possible that the obtained sentences of the second language are similar to the ideal translation of the input sentence, and therefore, it is also highly possible that the final translation is the ideal translation of the input sentence.

The step of computing the score includes the steps of computing a prescribed measure of similarity, using document frequency defined on the input sentence regarding a sentence of the first language contained in the bilingual corpus as a document, between the input sentence and each of the sentences of the first language contained in the bilingual corpus, computing edit distance between the input sentence and each of the sentences of the first language contained in the bilingual corpus, and computing the score based on the measure of similarity computed in the step of computing similarity and on the edit distance computed in the step of computing edit distance.

Preferably, the step of computing similarity includes the step of computing a tf/idf criteria $P_{tf/idf}$ in accordance with the following equation, between each sentence of the first language contained in the bilingual corpus and the input sentence:

$$P_{tf/idf}(J_k, J_0) = \sum_{i: J_{0,i} \in J_k} \frac{\log(N / df(J_{0,i})) / \log N}{|J_0|}$$

where $J_0$ is the input sentence, $J_{0,i}$ is the i-th word of input sentence $J_0$, $df(J_{0,i})$ is the document frequency for the word $J_{0,i}$, $J_k$ is a k-th sentence of the first language ($1 \leq k \leq N$) and N is the total number of translation pairs in the bilingual corpus.

Further, the step of computing edit distance includes the step of computing the edit distance $dis(J_k, J_0)$ by performing DP (Dynamic Programming) matching between the input sentence $J_0$ and a sentence $J_k$ of the first language, and the edit distance $dis(J_k, J_0)$ is determined by the following equation $$dis(J_k, J_0) = I(J_k, J_0) + D(J_k, J_0) + S(J_k, J_0)$$

where k is an integer satisfying $1 \leq k \leq N$, and $I(J_k, J_0)$, $D(J_k, J_0)$ and $S(J_k, J_0)$ are the number of insertions, deletions and substitutions respectively, necessary for modifying the sentence $J_0$ to sentence $J_k$.

The step of computing the score of a sentence $J_k$ of the first language in accordance with the equation below, based on the tf/idf criteria $P_{tf/idf}$ computed in the step of computing the similarity measure and on the edit distance computed in the step of computing edit distance $$score = \begin{cases} (1.0 - \alpha)\left(1.0 - \dfrac{dis(J_k, J_0)}{|J_0|}\right) + \alpha P_{tf/idf}(J_k, J_0) & \text{(if } dis(J_k, J_0) > 0) \\ 1.0 & \text{(otherwise)} \end{cases}$$

where $\alpha$ is a tuning parameter, and selecting, as the initial candidate, a predetermined number of translations in order from one having the highest score computed in the step of computing the score.

The method may further include the steps of: determining whether a sentence having the score of 1 exists among the sentences of the first language read in the step of reading; and in response to a determination in the step of determining that a sentence having the score of 1 exists, outputting the sentence of the first language having the score of 1 as a translation of the input sentence.

The score being 1 means that a sentence of the first language identical with the input sentence exists in the bilingual corpus. Therefore, by selecting a sentence of the second language paired with that sentence of the first language, a good translation can be obtained.

The step of repeating may include the step of repeating, on each of the sentences selected in the step of selecting, the steps of extracting, computing and selecting on each of the sentences selected in the step of selecting, until likelihood of the sentence selected in the step of selecting no longer improves.

Preferably, the step of outputting includes the step of outputting as a translation of the input sentence, a sentence having the highest likelihood among the sentences of the second language left at the end of the step of repeating.

As the sentence having the highest likelihood is output as the translation of the input sentence, the possibility of finding a translation closest to the ideal translation of the input language can be increased.

According to a second aspect, the present invention provides a recording medium recording a machine translation computer program causing, when executed by a computer, the computer to perform a method of machine translation using a bilingual corpus containing a plurality of translation pairs each consisting of a sentence of a first language and a sentence of a second language, for translating an input sentence of the first language to the second language, the method including the steps of: receiving the input sentence of the first language and extracting, from the bilingual corpus, a sentence of the second language forming a pair with a sentence of the first language satisfying a prescribed relation with the input sentence; applying an arbitrary modification among a plurality of predetermined modifications to the extracted sentence of the second language, and computing likelihood of sentences resulting from the modification; selecting sentences having the likelihood satisfying a prescribed condition from among the sentences resulting from the modification; repeating, on each of the sentences selected in the step of selecting, the steps of extracting, computing and selecting, until a predetermined termination condition is satisfied; and outputting, as a translation of the input sentence, a sentence having the likelihood satisfying a predetermined selection condition among the sentences of the second language left at the end of the step of repeating.

When the program recorded on the recording medium is executed by a computer, it is possible to cause the computer to perform the method of machine translation described above.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An example-based translation has been known as a machine translation system different from the word-by-word translation system such as seen in beam search strategies. The example-based translation is one of the translation methods based on bilingual corpus. The bilingual corpus contains a large number of translation pairs consisting of sentences of a first language and their translations of a second language. Given an input sentence of the first language, a sentence of the first language similar to the input sentence is searched out from the bilingual corpus, and based on the translation (second language) of the thus searched out sentence of the first language, an output sentence is formed.

The machine translation system in accordance with the present embodiment provides a new framework combining the example-based translation system and the statistical machine translation system.

—Configuration—

Figure 1:
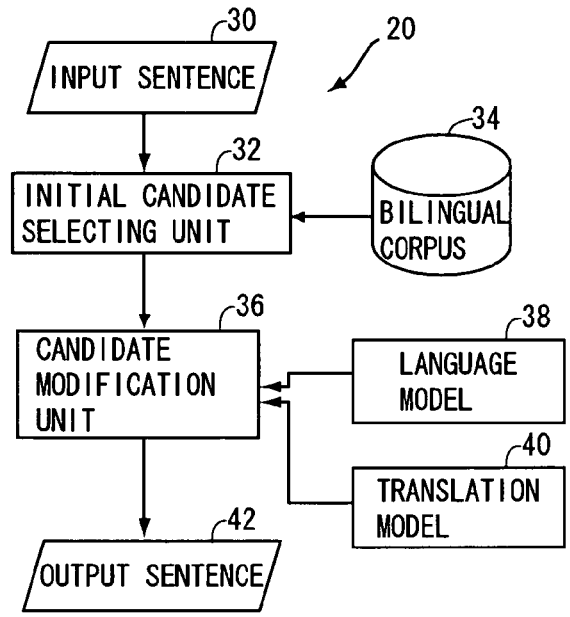
FIG. 1 is a functional block diagram of a machine translation system in accordance with one embodiment of the present invention.

FIG. 1 is a block diagram of a machine translation system 20 in accordance with the present embodiment. Referring to FIG. 1, machine translation system 20 includes a bilingual corpus 34 containing a large number of translation pairs consisting of sentences of a first language (language J) and their translations of a second language (language E), and an initial candidate selecting unit 32 receiving an input sentence 30 of the first language for selecting a prescribed number (for example, 5) of sentences of the first language that are similar to an input sentence 30 from bilingual corpus 34.

Machine translation system 20 further includes a language model (P(E)) 38 of the second language and a translation model (P(J|E)) 40, and a candidate modification unit 36, for modifying, while searching, translation of the second language of each of the plurality of sentences of the first language selected by initial candidate selecting unit 32, and outputting, as an output sentence 42, a translation having highest likelihood that is computed by using language model 38 and translation model 40.

Figure 2:
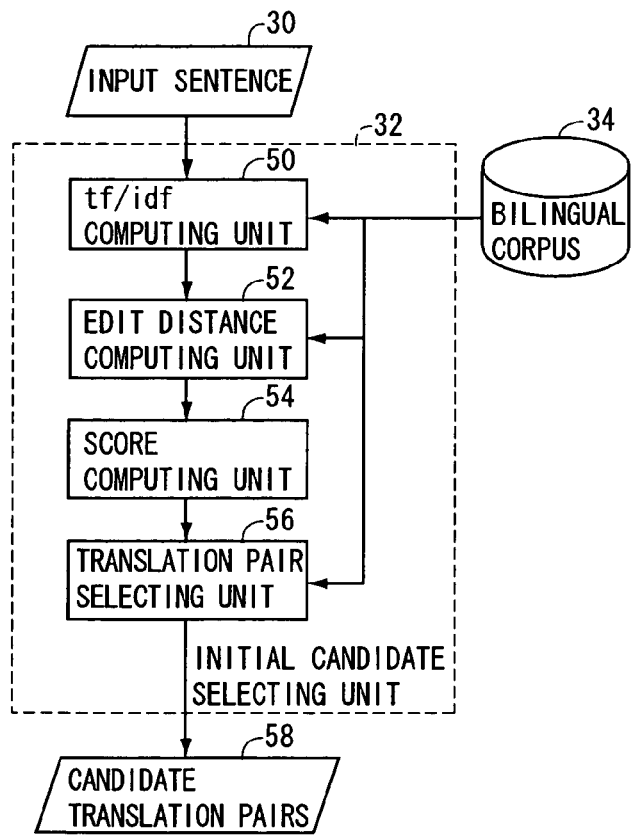
FIG. 2 is a more detailed functional block diagram of an initial candidate selecting unit 32 shown in FIG. 1.

FIG. 2 is a detailed block diagram of initial candidate selecting unit 32. Referring to FIG. 2, initial candidate selecting unit 32 includes a tf/idf computing unit 50 for computing a tf/idf criteria $P_{tf/idf}$ as a measure representing similarity between input sentence 30 and each of the sentences of the first language in bilingual corpus 34, with reference to bilingual corpus 34. The tf/idf criteria $P_{tf/idf}$ is defined by the following equation using a concept of document frequency, which is generally used in information retrieval algorithm, by treating each sentence of the first language in bilingual corpus 34 as one document.

$$P_{tf/idf}(J_k, J_0) = \sum_{i:J_{0,i} \in J_k} \frac{\log(N/df(J_{0,i}))/\log N}{|J_0|}$$

where $J_0$ is the input sentence, $J_{0,i}$ is the i-th word of input sentence $J_0$, $df(J_{0,i})$ is the document frequency for the i-th word $J_{0,i}$ of the input sentence $J_0$, and N is the total number of translation pairs in bilingual corpus 34. The document frequency $df(J_{0,i})$ refers to the number of documents (in the present embodiment, sentences) in which the i-th word $J_{0,i}$ of input sentence $J_0$ appears.

Initial candidate selecting unit 32 further includes an edit distance computing unit 52 for computing an edit distance $dis(J_k, J_0)$ by performing DP (Dynamic Programming) matching between a sentence $J_k$ of the first language in each translation pair $(J_k, E_k)$ contained in bilingual corpus 34 and the input sentence $J_0$, and a score computing unit 54 for computing the score of each sentence in accordance with the equation below, based on the tf/idf criteria $P_{tf/idf}$ computed by tf/idf computing unit 50 and on the edit distance computed by edit distance computing unit 52.

The edit distance $dis(J_k, J_0)$ computed by edit distance computing unit 52 is represented by the following equation.

$$dis(J_k, J_0) = I(J_k, J_0) + D(J_k, J_0) + S(J_k, J_0)$$

where k is an integer satisfying $1 \leq k \leq N$, and $I(J_k, J_0)$, $D(J_k, J_0)$ and $S(J_k, J_0)$ are the number of insertions/deletions/substitutions respectively, from sentence $J_0$ to sentence $J_k$.

The score computed by score computing unit 54 is represented by the following equation.

$$\text{score} = \begin{cases} (1.0 - \alpha)\left(1.0 - \dfrac{dis(J_k, J_0)}{|J_0|}\right) + \alpha P_{tf/idf}(J_k, J_0) & (\text{if } dis(J_k, J_0) > 0) \\ 1.0 & (\text{otherwise}) \end{cases}$$

where $\alpha$ is a tuning parameter, and is set to $\alpha = 0.2$ in the present embodiment.

Referring to FIG. 2, initial candidate selecting unit 32 further includes a translation pair selecting unit 56 for selecting a prescribed number (5 in the present embodiment) of translation pairs having high scores, based on the score computed by score computing unit 54, and outputting the selected translation pairs as candidate translation pairs 58 to candidate modification unit 36 shown in FIG. 1.

Figure 3:
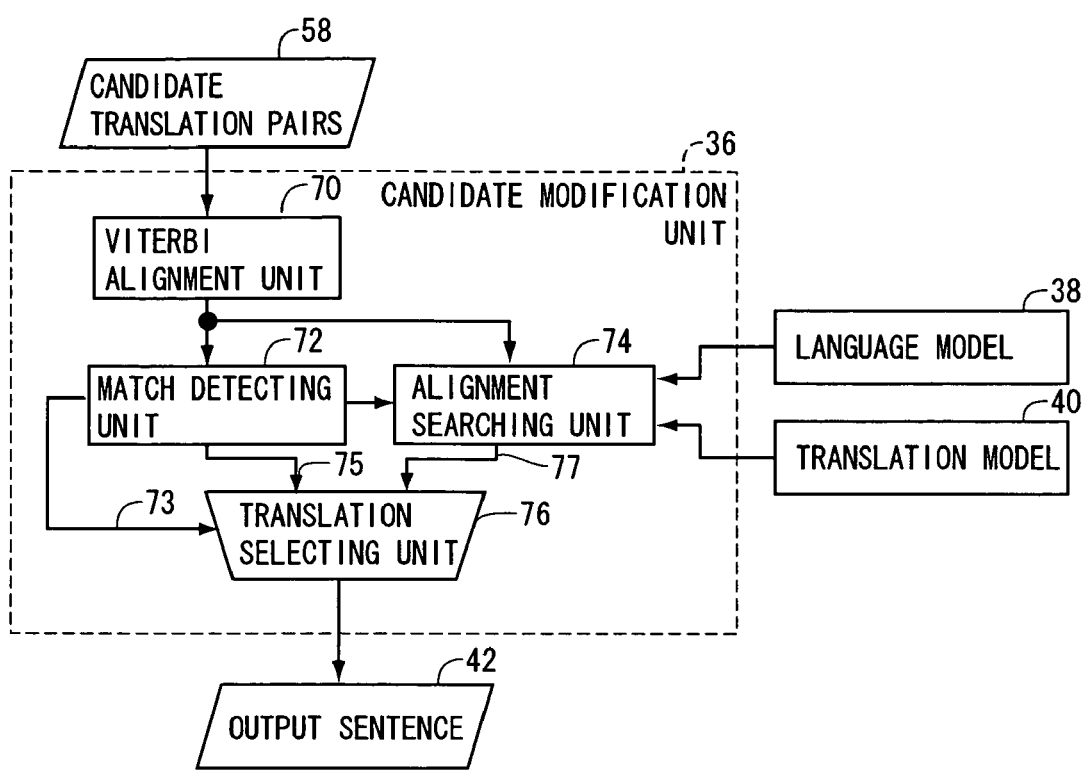
FIG. 3 is a more detailed functional block diagram of a candidate modification unit 36 shown in FIG. 1.

FIG. 3 is a detailed block diagram of candidate modification unit 36 shown in FIG. 1. Referring to FIG. 3, candidate modification unit 36 includes a Viterbi alignment unit 70 receiving each initial candidate translation pair $(J_k, E_k)$ included in candidate translation pairs 58 output from initial candidate selecting unit 32 and computing a Viterbi alignment having the highest likelihood between the input sentence of the first language and the sentence of the second language, using the language model and the translation model. By the Viterbi alignment unit 70, an initial alignment $A_k$ for a new candidate translation pair $(J_0, E_k)$ consisting of the input sentence $J_0$ and a sentence $E_k$ of the second language from each candidate translation pair $(J_k, E_k)$ is computed. A candidate translation pair of which alignment is completed will be represented as $(J_0, A_k, E_k)$.

Candidate modification unit 36 further includes: a match detecting unit 72 determining whether an alignment completed candidate translation pair $(J_0, A_k, E_k)$ having the score of 1 exists among the alignment completed candidate translation pairs with the alignment $A_k$ computed by Viterbi alignment unit 70, outputting a match detecting signal 73 that assumes a first value when there is a match and a second value when not, and outputting, when there exists a candidate translation pair having the score of 1, the candidate translation pair 75 together with its alignment; and an alignment searching unit 74 performing a modification as will be described later on the alignment $A_k$ and translation $E_k$ of an alignment completed candidate translation pair $(J_0, A_k, E_k)$ applied from Viterbi alignment unit 70, when a match is not detected by match detecting unit 72, and finally outputting a translation pair 77 having the highest likelihood as a translation of input 30 together with its alignment. Alignment searching unit 74 uses language model 38 and translation model 40, which will be described later, in this search. When a match is detected, match detecting unit 72 stops execution of the alignment search by alignment searching unit 74.

Candidate modification unit 36 further includes a translation selecting unit 76 responsive to match detecting signal 73 output from match detecting unit 72, for selecting either the translation 75 output from match detecting unit 72 or translation 77 output from alignment searching unit 74 dependent on whether the match detecting signal is of the first value or the second value, and outputting the selected translation as an output sentence 42.

Figure 4:
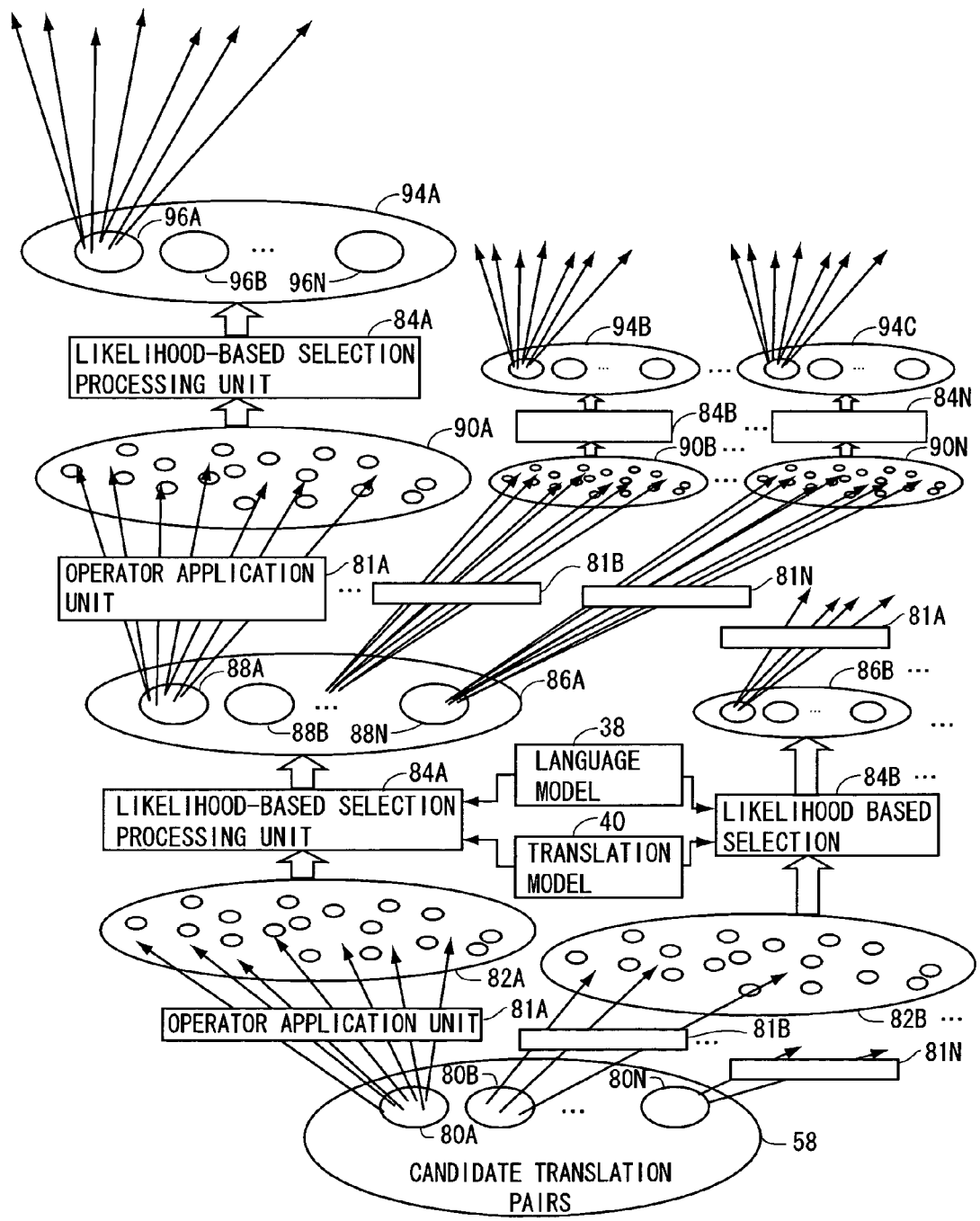
FIG. 4 is a schematic diagram representing details of a process performed by an alignment searching unit 74 shown in FIG. 3.

FIG. 4 shows an outline of the search for the modification candidate sentence and the hill climbing algorithm performed by alignment searching unit 74. Referring to FIG. 4, alignment searching unit 74 includes operator application units 81A, 81B, . . . applying an operator representing movement, deletion, replacement or the like of a word on alignment completed translation pairs 80A, . . . , 80N, included in candidate translation pairs 58 applied from Viterbi alignment unit 70 to modify the alignments, and generating a number of new candidate translation pair groups 82A, 82B, . . . . Alignment searching unit 74 further includes likelihood-based selection processing units 84A, 84B, . . . computing likelihood of each of the alignment-modified translation pairs included in each of the groups of candidate translation pairs 82A, 82B, . . . obtained in this manner, using language model 38 and translation model 40, leaving a prescribed number (5 in the present embodiment) of candidate translation pairs having higher likelihood, starting from the one having the highest likelihood, among each group of candidate translation pairs and deleting other candidate translation pairs, to generate new groups of candidate translation pairs 86A, 86B, . . . .

Operator application units 81A, 81B, . . . of alignment searching unit 74 also performs the operation described above on candidate translation pairs 88A, . . . , 88N included in group 86A of candidate translation pairs, to form new groups of candidate translation pairs 90A, . . . , 90N. Likelihood-based selection processing units 84A, 84B, . . . again leave candidate translation pairs 96A, . . . , 96N having higher likelihood computed by using language model 38 and translation model 40, and form new groups of candidate translation pairs 94A, . . . , 94N.

In this manner, alignment searching unit 74 apply operators successively on the alignments of translation pairs, using candidate translation pairs 80A, . . , 80N included in the first candidate translation pair 58 as seeds, to form new candidate translation pairs. Alignment searching unit 74 stops the repetitive operation described above when it is determined that the likelihood computed for candidate translation pairs is no longer improved, when the candidate translation pairs are selected by likelihood-based selection processing units 84A, 84B, . . . (hill climbing method).

In this manner, alignment searching unit 74 searches for and modifies alignments of translation pairs, and a translation having the highest likelihood among the candidate translation pairs and alignments found through the searching process in accordance with the hill climbing method is output as an output sentence 42.

The operators used by operator application units 81A, 81B, . . . to be applied to the alignment completed candidate translation pairs ($J_0$, $A_k$, $E_k$) are approximately the same as those described in the article of Germann et al. mentioned above, and details of the operators are as follows.

(1) Translate words

Modify the output word $E_{Aj}$ to a word e aligned from $J_{0,j}$. If e=NULL, then $J_{0,j}$ is aligned to NULL and $A_j$=0. When the fertility of $E_{Aj}$ becomes 0, then the word $E_{Aj}$ is removed. The word e is selected from among the candidates, computed from the inverse of the Lexicon Model.

(2) Translate and insert words

Perform the translation of a word, and insert a sequence of zero fertility words at appropriate positions. The candidate sequence of zero fertility words is selected from the Viterbi alignment of the training corpus.

(3) Translate and align words

Move the j-th word $E_j$ of the alignment to i, and modify the i-th word $E_i$ to word e.

(4) Move alignment

This operator does not alter the output word sequence, but modify the alignment A through moving/swapping.

(5) Swap segments

Swap non-overlapping subsets of translation E, by swapping a segment from $i_0$ to $i_1$ and from $i_2$ to $i_3$ (where $i_1 < i_2$).

(6) Remove words

Remove a sequence of zero fertility words from translation E.

(7) Join words

Join the words of translations $E_i$ and $E_{i'}$ when the fertility of both of the words is more than or equal to 1.

Among these seven operators, five operators other than (3) and (4) are approximately the same as those proposed by Germann et al. The operators (3) and (4) are newly added in the present embodiment. At the first Viterbi alignment performed by Viterbi alignment unit 70, if there exists a word in a sentence of the first language whose translation do not exist in the sentence of the second language, the word will sometimes be aligned with NULL or with an irrelevant word by raising the fertility. Here, by the translate-and-align-words operator (3), it becomes possible to find the right word-by-word translation using the Lexicon Model, with the alignment forced to move to another word. Further, by the move-alignment operator (4), similar effect can be attained by moving the existing alignments.

—Operation—

Machine translation system 20 operates as follows. A number of translation pairs consisting of sentences of the first language and translations of the second language are prepared in bilingual corpus 34. It is assumed that language model 38 and translation model 40 have also been prepared by some means or another.

Referring to FIG. 1, an input sentence 30 is given to initial candidate selecting unit 32. Referring to FIG. 2, tf/idf computing unit 50 of initial candidate selecting unit 32 computes a tf/idf criteria $P_{tf/idf}$ between input sentence 30 and each of the sentences of the first language among all the translation pairs in bilingual corpus 34. Similarly, edit distance computing unit 52 computes edit distance $dis(J_k, J_0)$ between input sentence 30 and each sentence $J_k$ of the first language among all the translation pairs in bilingual corpus 34.

Score computing unit 54 computes the score described above in accordance with the following equation, using the tf/idf criteria $P_{tf/idf}$ computed by tf/idf computing unit 50 and edit distance $dis(J_k, J_0)$ computed by edit distance computing unit 52.

$$score = \begin{cases} (1.0 - \alpha)\left(1.0 - \dfrac{dis(J_k, J_0)}{|J_0|}\right) + \alpha P_{tf/idf}(J_k, J_0) & \text{(if } dis(J_k, J_0) > 0) \\ 1.0 & \text{(otherwise)} \end{cases}$$

Translation pair selecting unit 56 selects a prescribed number of translation pairs starting from the one having the highest score from among the translation pairs in bilingual corpus 34, and applies the selected pairs to Viterbi alignment unit 70 of FIG. 3, as candidate translation pairs.

Referring to FIG. 3, Viterbi alignment unit 70 computes a Viterbi alignment $A_k$ of a sentence $E_k$ of the second language of each of the translation pairs ($J_k$, $E_k$) in the applied candidate translation pairs 58 and input sentence $J_0$, and applies the result to match detecting unit 72 and to alignment searching unit 74 in the form of ($J_0$, $A_k$, $E_k$).

Match detecting unit 72 determines whether there exists a translation pair having the score of one (score=1) among the translation pairs applied from Viterbi alignment unit 70. Specifically, match detecting unit 72 determines whether there exists a sentence of the first language that is identical with the input sentence 30, among the candidate translation pairs. When there exists such a sentence, match detecting unit 72 sets the match detecting signal 73 to a first value, and otherwise, match detecting unit 72 sets the match detecting signal 73 to a second value. Further, when there exists such a sentence, match detecting unit 72 applies the translation pair as a translation pair 75 to translation selecting unit 76.

Alignment searching unit 74 performs the searching operation as described above with reference to language model 38 and translation model 40, using the alignment completed candidate translation pair ($J_0$, $A_k$, $E_k$) applied from Viterbi alignment unit 70 as a seed, and continues searching until highest likelihood is attained, in accordance with the hill climbing method. In the process of searching, alignment searching unit 74 generates, for every candidate translation pair, new candidate translation pairs (and alignment thereof) by applying all possible parameters. Further, alignment searching unit 74 leaves candidate translation pairs that satisfy a prescribed condition (a prescribed number of translation pairs having high scores, starting from the one having the highest score) among the candidate translations (and alignment thereof) generated in this manner, and removes others. Further, alignment searching unit 74 repeats similar processing using the rest of the candidate translation pairs as seeds. When likelihood computed for the generated candidate translations cannot be further improved, the search along that path is terminated (hill climbing method).

In this manner, a translation pair providing the highest likelihood at the end of searching along every path is given as a final output. Alignment searching unit 74 applies the translation pair 77 to translation selecting unit 76. When the match detecting signal 73 is at the first value, translation selecting unit 76 selects the translation 75, that is an output of match detecting unit 72, and when the match detecting signal 73 is at the second value, translation selecting unit 76 selects translation 77, that is the output of alignment searching unit 74, and outputs the selected translation as an output sentence 42.

—Evaluation—

Translation accuracy of the system in accordance with the embodiment described above was evaluated. A travel expression corpus prepared by the applicant was used as the corpus. The corpus contained translation pairs of Japanese, English, Korean and Chinese. Statistical information of the corpus is as shown in the table below.

<PER> Position independent WER, which penalizes only by insertion/deletion without considering positional disfluencies.

<BLEU> BLEU score, which computes the ratio of the n-gram for the translation results found in reference translations. Contrary to the above error merits WER and PER, the higher scores indicate better translations.

<SE> Subjective evaluation ranks ranging from A to D (A perfect, B fair, C acceptable and D nonsense), judged by a native speaker. The scores are evaluated by the ratio of A ranked sentences, A+B for either A or B ranks, and A+B+C for either A, B or C ranks. In the present experiment, only a language to English translation and a language to Japanese translation were evaluated among the four languages, assuming that they were translations for Japanese-to-English and English-to-Japanese, respectively. In the table, values in thin font represent results of translation by a machine translation apparatus based on beam search system, and values in bold font represent results of translation by the machine translation apparatus in accordance with the present embodiment.

|     | WER [%] |      | PER [%] |      | BLEU [%] |      | Subjective Evaluation (SE) [%] |      |      |      |      |      |
|-----|---------|------|---------|------|----------|------|------|------|------|------|------|------|
|     |         |      |         |      |          |      | A    |      | A + B |     | A + B + C | |
| C-E | 45.0    | 34.3 | 39.8 | 30.3 | 43.6 | 56.7 | 48.4 | 65.0 | 65.9 | 76.9 | 71.4 | 81.0 |
| C-J | 35.7    | 25.5 | 31.3 | 22.6 | 56.9 | 67.8 | 50.8 | 69.0 | 59.4 | 74.3 | 66.9 | 80.2 |
| C-K | 38.4    | 29.1 | 34.2 | 26.2 | 56.1 | 65.0 | —    | —    | —    | —    | —    | —    |
| E-C | 45.0    | 38.0 | 39.7 | 33.4 | 42.1 | 51.9 | —    | —    | —    | —    | —    | —    |
| E-J | 34.2    | 29.0 | 30.5 | 26.1 | 59.2 | 65.7 | 55.8 | 65.1 | 62.4 | 71.6 | 70.2 | 77.8 |
| E-K | 38.7    | 35.6 | 34.3 | 31.6 | 57.3 | 61.5 | —    | —    | —    | —    | —    | —    |
| J-C | 46.8    | 33.0 | 38.9 | 27.8 | 39.7 | 57.1 | —    | —    | —    | —    | —    | —    |
| J-E | 42.9    | 35.0 | 37.4 | 30.3 | 47.6 | 57.4 | 50.8 | 63.7 | 65.7 | 74.5 | 70.2 | 77.6 |
| J-K | 27.7    | 20.8 | 25.4 | 19.2 | 67.2 | 73.5 | —    | —    | —    | —    | —    | —    |
| K-C | 41.9    | 32.9 | 34.4 | 27.6 | 45.1 | 55.5 | —    | —    | —    | —    | —    | —    |
| K-E | 45.1    | 36.4 | 38.5 | 32.1 | 44.3 | 56.8 | 49.2 | 61.6 | 65.7 | 72.9 | 72.2 | 78.4 |
| K-J | 26.8    | 20.8 | 24.6 | 19.3 | 64.3 | 70.8 | 56.5 | 69.2 | 66.5 | 77.5 | 78.4 | 84.7 |

TABLE 1

|                  | Chinese | English | Japanese  | Korean    |
|------------------|---------|---------|-----------|-----------|
| # of sentences   |         |         | 167,163   |           |
| # of words       | 956,732 | 980,790 | 1,148,428 | 1,269,888 |
| vocabulary size  | 16,411  | 15,641  | 21,896    | 13,395    |
| # of singletons  | 5,207   | 5,547   | 9,220     | 4,191     |
| 3-gram perplexity | 45.33  | 35.35   | 24.06     | 20.34     |

The entire corpus was split into three parts. Specifically, 152,169 sentences were used for training of the translation model and language model, 4,849 sentences were used for testing, and the remaining 10,148 sentences were used for parameter tuning, such as the termination criteria for the training iteration and the parameter tuning for decoders.

Tri-gram language models for the four languages were trained and evaluated by the perplexity measure as shown in Table 1. For all the combinations of the four languages, 12 translation models were trained in bi-directional translation.

The table below shows translation results among the four languages attained by the system in accordance with the present embodiment. Abbreviations used in the table stand for the following.

<WER> Word-error-rate, which penalizes the edit distance (insertion/deletion/substitution) against reference translations.

As is apparent from the table, for all the language pairs and directions, better results are obtained by the machine translation apparatus in accordance with the present embodiment than the machine translation apparatus based on beam search system. The difference is substantial, and it has been clear that the machine translation apparatus in accordance with the present embodiment has far better performance than the beam-search based one. Further, the result of translation in accordance with the present invention is stable, and hardly results in local optimal solution. The reason for this may be that a sentence close to an input sentence is searched as a first solution, and using this as a starting point, searching combined with the hill climbing method is employed, so that the possibility of attaining the optimal translation in global aspect becomes higher.

As for the selection of the initial candidate by initial candidate selecting unit 32, if it is possible to find a translation pair having a sentence of the first language close to the input sentence 30 by some reference, a unit having a scheme different from that of initial candidate selecting unit 32 used in the embodiment above may be employed. There may be a case that a translation for an input sentence cannot be searched by the unit of a sentence from bilingual corpus 34. If the search on sentence unit is impossible, the input sentence may be divided into a smaller unit, such as a clause or a phrase, translation thereof may be searched out on the divided unit from bilingual corpus 34, and an initial candidate may be formed by the combination of such search results.

In place of the selection of the initial candidate by initial candidate selecting unit 32, the input sentence may be translated by using a translation machine in accordance with some other mechanism, and the resulting translation may be used as the initial candidate. By way of example, an example-based translation machine may be used as the translation machine and the result of example-based translation may be used as the initial candidate. In that case, the bilingual corpus used in the example-based translation may be bilingual corpus 34, or may be a different corpus.

Though an algorithm similar to a breadth first search was used in the hill climbing method executed by alignment searching unit 74, the present invention is not limited to such an embodiment, and theoretically, use of the depth first search algorithm is possible.

—Computer Implementation—

The machine translation apparatus in accordance with the present embodiment may be implemented by a computer hardware, a program executed on the computer hardware, and the bilingual corpus, translation model and language model stored in a storage of the computer. Particularly, the search by alignment searching unit 74 shown in FIG. 4 can efficiently be executed by using a recursive programming.

Such a program may be readily realized by a person skilled in the art from the description of the embodiment above.

Figure 5:
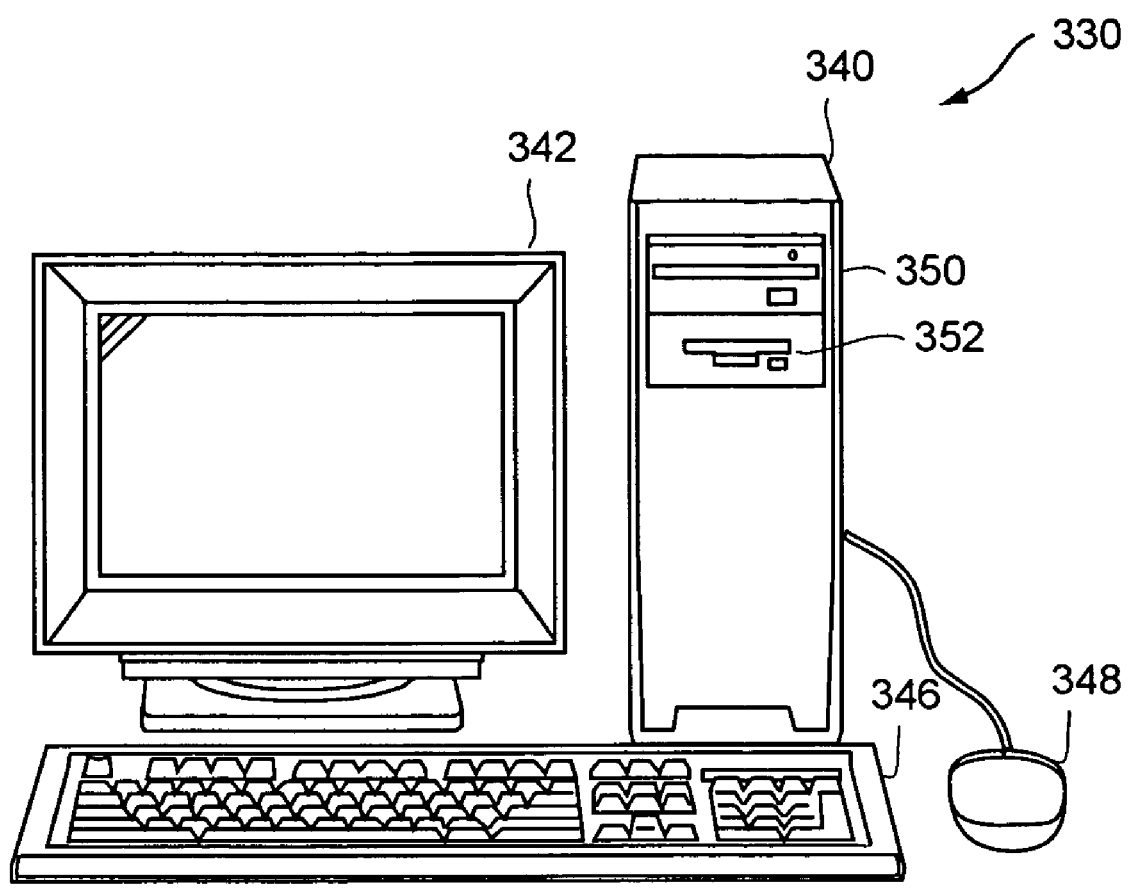
FIG. 5 shows an appearance of a computer realizing the machine translation system in accordance with one embodiment of the present invention.
Figure 6:
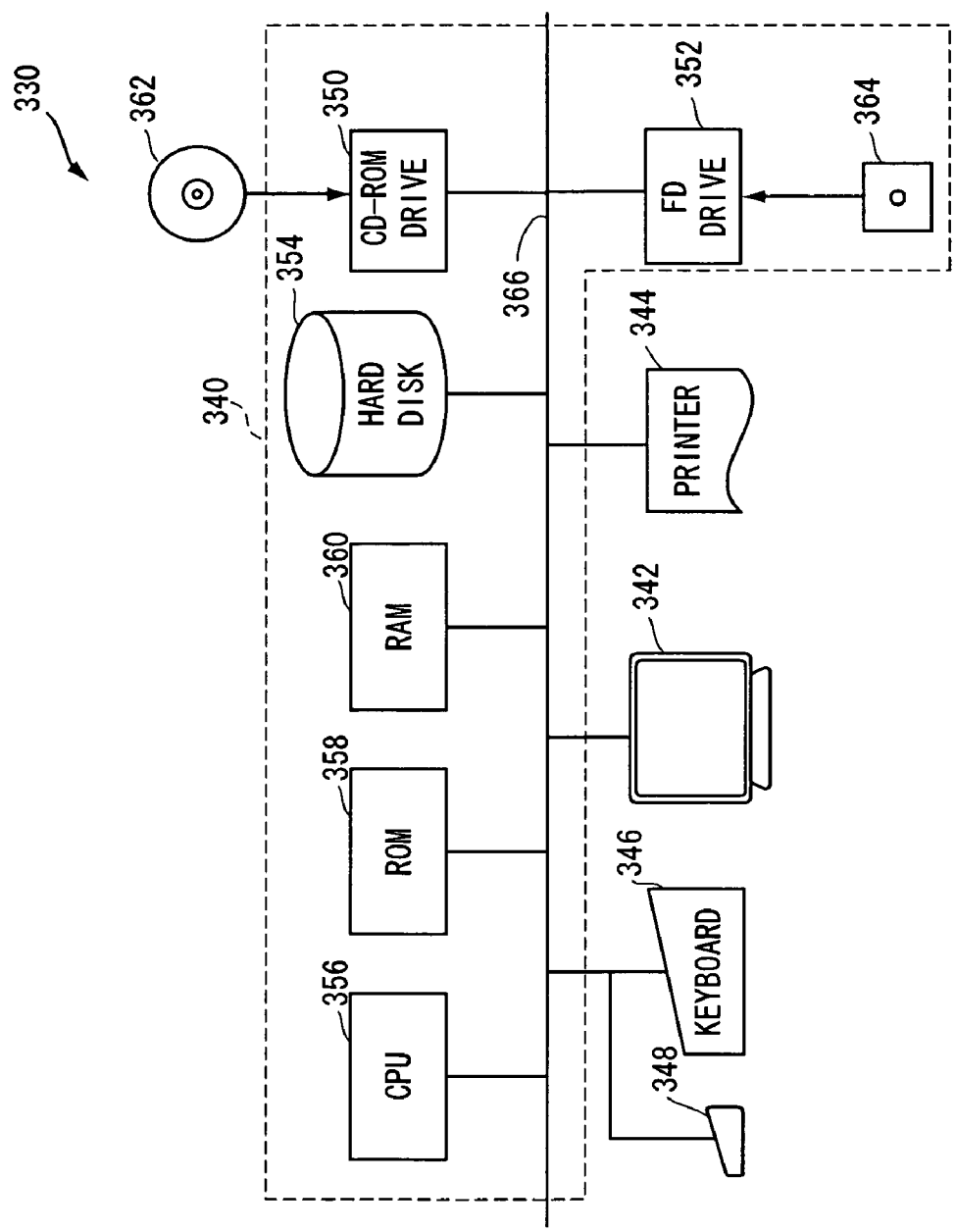
FIG. 6 is a block diagram of the computer shown in FIG. 5.
Figure 7:
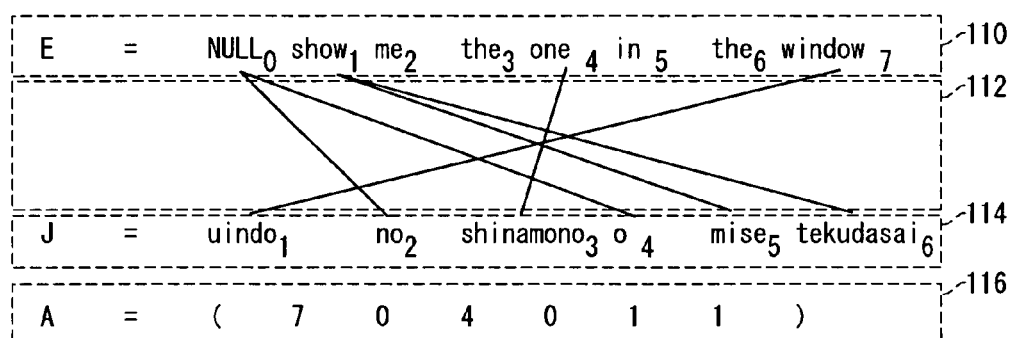
FIG. 7 shows an example of word alignment.

FIG. 5 shows an appearance of a computer system 330 implementing the machine translation apparatus, and FIG. 6 shows an internal configuration of computer system 330.

Referring to FIG. 5, computer system 330 includes a computer 340 having a FD (Flexible Disk) drive 352 and a CD-ROM drive (Compact Disc Read Only Memory) drive 350, a key board 346, a mouse 348 and a monitor 342.

Referring to FIG. 6, computer 340 includes, in addition to FD drive 352 and CD-ROM drive 350, a CPU (Central Processing Unit) 356, a bus 366 connected to CPU 356, FD drive 352 and CD-ROM drive 350, a read only memory (ROM) 358 stoling a boot-up program and the like, and a random access memory (RAM) 360 connected to bus 366 and storing program instructions, system program, work data and the like. Computer system 330 further includes a printer 344.

Though it is not shown the drawings, computer 340 may further include a network adapter board providing a connection to a local area network (LAN).

A computer program to cause computer system 330 to operate as a machine translation apparatus is stored on a CD-ROM 362 or an FD 364 that is mounted to CD-ROM drive 350 or FD drive 352, and transferred to a hard disk 354. Alternatively, the program may be transmitted through a network, not shown, and stored in hard disk 354. The program is loaded to RAM 360 at the time of execution. The program may be directly loaded to RAM 360 from CD-ROM 362, FD 364 or through the network.

The program includes a plurality of instructions that cause computer 340 to execute operations as the machine translation apparatus in accordance with the present embodiment. Because some of the basic functions needed to perform the present method will be provided by the operating system (OS) running on computer 340 or a third party program, or modules of various tool kits installed on computer 340, the program does not necessarily contain all of the basic functions needed to the system and method of the present embodiment. The program may need to contain only those parts of instructions that will realize the machine translation apparatus by calling appropriate functions or "tools" in a controlled manner such that the desired result will be obtained. How the computer system 330 operates is well known, and therefore, it is not described here.

The embodiments as have been described here are mere examples and should not be interpreted as restrictive. The scope of the present invention is determined by each of the claims with appropriate consideration of the written description of the embodiments and embraces modifications within the meaning of, and equivalent to, the languages in the claims.

What is claimed is:

1. A method of machine translation, using a bilingual corpus containing a plurality of translation pairs each consisting of a sentence of a first language and a sentence of a second language, for translating an input sentence of said first language to said second language, comprising steps of:

receiving the input sentence of said first language;

computing a score between the input sentence and a plurality of sentences of the first language contained in said bilingual corpus;

identifying, based on the result of said step of computing the score, a first sentence among the plurality of sentences of the first language having a prescribed score representing a similarity to the input sentence;

extracting, from said bilingual corpus, a sentence of said second language forming a pair with the first sentence;

applying an arbitrary modification among a plurality of predetermined modifications to said extracted sentence of said second language, and computing likelihood of sentences resulting from the modification;

selecting sentences having the likelihood satisfying a prescribed condition from among the sentences resulting from the modification;

repeating, on each of the sentences selected in said step of selecting, said steps of extracting, computing the likelihood and selecting, until a predetermined termination condition is satisfied; and outputting, as a translation of said input sentence, a sentence having the likelihood satisfying a predetermined selection condition among the sentences of said second language left at the end of said step of repeating, wherein:

said step of computing the score includes computing a score between the input sentence and each sentence of said first language contained in said bilingual corpus, said step of computing the score includes steps of computing a prescribed measure of similarity, using document frequency defined on said input sentence regarding a sentence of said first language contained in said bilingual corpus as a document, between said input sentence and each of the sentences of said first language contained in said bilingual corpus, computing edit distance between said input sentence and each of the sentences of said first language contained in said bilingual corpus, and computing said score based on the measure of similarity computed in said step of computing similarity and on the edit distance computed in said step of computing edit distance, said step of identifying the first sentence includes identifying a first sentence of said first language having the highest score computed, in said step of computing the score, said step of extracting the sentence of said second language includes extracting, from said bilingual corpus, a sentence of said second language forming a pair with the first sentence having the highest score, computed in said step of computing the score, and said step of computing similarity includes the step of computing a tf/idf criteria $P_{tf/idf}$ in accordance with the following equation, between each sentence of said first language contained in said bilingual corpus and said input sentence:

$$P_{tf/idf}(J_k, J_0) = \sum_{i:J_{0,i} \in J_k} \frac{\log(N/df(J_{0,i}))/\log N}{|J_0|}$$

where $J_o$ is the input sentence, $J_{o,i}$ is the i-th word of input sentence $J_o$, $df(J_{o,i})$ is the document frequency for the word $J_{o,i}$, $J_k$ is a k-th sentence of said first language ($1 \leq k \leq N$) and N is the total number of translation pairs in the bilingual corpus.

2. The method of machine translation according to claim 1, wherein
said step of computing edit distance includes the step of computing the edit distance $dis(J_k, J_o)$ by performing DP (Dynamic Programming) matching between the input sentence $J_o$ and a sentence $J_k$ of said first language, and the edit distance $dis(J_k, J_o)$ is determined by the following equation $$dis(J_k, J_o) = I(J_k, J_o) + D(J_k, J_o) + S(J_k, J_o)$$

where k is an integer satisfying $1 \leq k \leq N$, and $I(J_k, J_o)$, $D(J_k, J_o)$ and $S(J_k, J_o)$ are the number of insertions, deletions and substitutions respectively, necessary for modifying the sentence $J_o$ to sentence $J_k$.

3. The method of machine translation according to claim 2, wherein
said step of computing the score of a sentence $J_k$ of the first language in accordance with the equation below, based on the tf/idf criteria $P_{tf/idf}$ computed in the step of computing said similarity measure and on the edit distance computed in the step of computing edit distance $$score = \begin{cases} (1.0 - \alpha)\left(1.0 - \frac{dis(J_k, J_0)}{|J_0|}\right) + \alpha P_{tf/idf}(J_k, J_0) & \text{(if } dis(J_k, J_0) > 0) \\ 1.0 & \text{(otherwise)} \end{cases}$$

where $\alpha$ is a tuning parameter, and
selecting, as said initial candidate, a predetermined number of translations in order from one having the highest score computed in said step of computing the score.

4. The method of machine translation according to claim 3, further comprising the steps of:
determining whether a sentence having said score of 1 exists among the sentences of said first language read in said step of reading; and
in response to a determination in said step of determining that a sentence having the score of 1 exists, outputting said sentence of said first language having the score of 1 as a translation of said input sentence.

5. The method of machine translation according to claim 4, further comprising the step of
in response to a determination in said step of determining that a sentence of the first language having the score of 1 exists, stopping execution of said step of repeating said steps of extracting, computing and selecting on each of the sentences selected in said step of selecting and execution of said step of outputting.

6. A recording medium recording a machine translation computer program causing, when executed by a computer, the computer to perform a method of machine translation using a bilingual corpus containing a plurality of translation pairs each consisting of a sentence of a first language and a sentence of a second language, for translating an input sentence of said first language to said second language, said method including steps of:

receiving the input sentence of said first language;

computing a score between the input sentence and a plurality of sentences of the first language contained in said bilingual corpus;

identifying, based on the result of said step of computing the score, a first sentence among the plurality of sentences of the first language having a prescribed score representing a similarity to the input sentence;

extracting, from said bilingual corpus, a sentence of said second language forming a pair with the first sentence;

applying an arbitrary modification among a plurality of predetermined modifications to said extracted sentence of said second language, and computing likelihood of sentences resulting from the modification;

selecting sentences having the likelihood satisfying a prescribed condition from among the sentences resulting from the modification;

repeating, on each of the sentences selected in said step of selecting, said steps of extracting, computing the likelihood and selecting, until a predetermined termination condition is satisfied; and outputting, as a translation of said input sentence, a sentence having the likelihood satisfying a predetermined selection condition among the sentences of said second language left at the end of said step of repeating, wherein:

said step of computing the score includes computing a score between the input sentence and each sentence of said first language contained in said bilingual corpus, the step of computing the score includes steps of computing a prescribed measure of similarity, using document frequency defined on said input sentence regarding a sentence of said first language contained in said bilingual corpus as a document, between said input sentence and each of the sentences of said first language contained in said bilingual corpus, computing edit distance between said input sentence and each of the sentences of said first language contained in said bilingual corpus, and computing said score based on the measure of similarity computed in said step of computing similarity and on the edit distance computed in said step of computing edit distance, said step of identifying the first sentence includes identifying a first sentence of said first language having the highest score, computed in said step of computing the score, said step of extracting the sentence of said second language includes extracting, from said bilingual corpus, a sentence of said second language forming a pair with the first sentence having the highest score, computed in said step of computing the score, and said step of computing similarity includes the step of computing a tf/idf criteria $P_{tf/idf}$ in accordance with the following equation, between each sentence of said first language contained in said bilingual corpus and said input sentence:

$$P_{tf/idf}(J_k, J_0) = \sum_{i:J_{0,i} \in J_k} \frac{\log(N/df(J_{0,i}))/\log N}{|J_0|}$$

where $J_o$ is the input sentence, $J_{o,i}$ is the i-th word of input sentence $J_o$, $df(J_{o,i})$ is the document frequency for the word $J_{o,i}$, $J_k$ is a k-th sentence of said first language ($1 \leq k \leq N$) and N is the total number of translation pairs in the bilingual corpus.

7. The recording medium according to claim 6, wherein said step of computing edit distance includes the step of computing the edit distance $dis(J_k, J_o)$ by performing DP (Dynamic Programming) matching between the input sentence $J_o$ and a sentence $J_k$ of said first language, and the edit distance $dis(J_k, J_o)$ is determined by the following equation $$dis(J_k, J_o) = I(J_k, J_o) + D(J_k, J_o) + S(J_k, J_o)$$

where k is an integer satisfying $1 \leq k \leq N$, and $I(J_k, J_o)$, $D(J_k, J_o)$ and $S(J_k, J_o)$ are the number of insertions, deletions and substitutions respectively, necessary for modifying the sentence $J_o$ to sentence $J_k$.

8. The recording medium according to claim 7, wherein said step of computing the score of a sentence $J_k$ of the first language in accordance with the equation below, based on the tf/idf criteria $P_{tf/idf}$ computed in the step of computing said similarity measure and on the edit distance computed by in the step of computing edit distance $$\text{score} = \begin{cases} (1.0 - \alpha)\left(1.0 - \frac{dis(J_k, J_0)}{|J_0|}\right) + \alpha P_{tf/idf}(J_k, J_0) & (\text{if } dis(J_k, J_0) > 0) \\ 1.0 & (\text{otherwise}) \end{cases}$$

where $\alpha$ is a tuning parameter, and
selecting, as said initial candidate, a predetermined number of translations in order from one having the highest score computed in said step of computing the score.

9. The recording medium according to claim 8, wherein said method further includes the steps of:
determining whether a sentence having said score of b 1 exists among the sentences of said first language read in said step of reading; and
in response to a determination in said step of determining that a sentence having the score of 1 exists, outputting said sentence of said first language having the score of 1 as a translation of said input sentence.

10. The recording medium according to claim 9, wherein said method further includes the step of
in response to a determination in said step of determining that a sentence of the first language having the score of 1 exists, stopping execution of said step of repeating said steps of extracting, computing and selecting on each of the sentences selected in said step of selecting and execution of said step of outputting.

* * * * *